United States Patent [19]

Fisher

[11] Patent Number: 5,504,846
[45] Date of Patent: Apr. 2, 1996

[54] METHOD AND APPARATUS FOR IMPROVED AREA DEMARCATION IN BIT MAPPED IMAGE DERIVED FROM MULTI-COLOR BIT MAPPED IMAGE

[75] Inventor: Jeffrey O. Fisher, Austin, Tex.

[73] Assignee: International Business Machines Corporation, Armonk, N.Y.

[21] Appl. No.: 168,568

[22] Filed: Dec. 16, 1993

[51] Int. Cl.⁶ ................................................. G06T 5/00
[52] U.S. Cl. .......................... 395/131; 395/132; 395/129
[58] Field of Search .................................... 395/131, 132, 395/129; 358/298, 515, 520, 529; 385/165

[56] References Cited

U.S. PATENT DOCUMENTS

| 4,482,917 | 11/1984 | Gaulke et al. | 358/80 |
| 4,635,078 | 1/1987 | Sakurada et al. | 346/140 R |
| 4,743,962 | 5/1988 | McCormick | 358/75 |
| 4,758,885 | 7/1988 | Sasaki | 358/80 |
| 4,814,867 | 3/1989 | Tsuda et al. | 358/80 |
| 4,905,164 | 2/1990 | Chandler et al. | 364/518 |
| 5,031,050 | 7/1991 | Chan | 358/298 |
| 5,153,577 | 10/1992 | Mackey et al. | 340/793 |
| 5,168,552 | 12/1992 | Vaughn et al. | 315/109 |

*Primary Examiner*—Heather R. Herndon
*Assistant Examiner*—Rudolph J. Buchel
*Attorney, Agent, or Firm*—Michael J. Buchenhorner; Romualdas Strimaitis; Douglas R. McKechnie

[57] ABSTRACT

Digital signals defining a bit mapped primary image are stored in a data processing system and displayed on a color monitor. These signals are processed by breaking down or separating the primary image into a set of areas where the pixels within each area have the same color. The set of areas is then analyzed to select a group of a minimum number of subgroups, which group contains all of the different areas. Different color/dither patterns are assigned to represent the different subgroups. Then, a derivative bit mapped image is produced in which the assigned representations are used, and the derivative image is then printed or displayed.

14 Claims, 3 Drawing Sheets

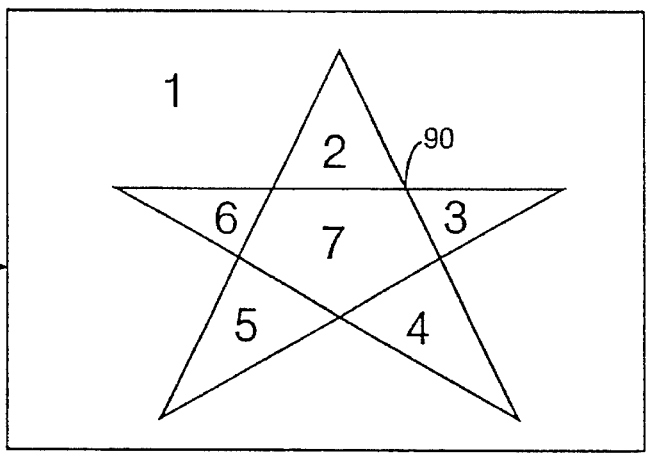
PRIMARY BITMAP 70
FIG. 3A
FIG. 3B
AAM 78
AREA
|   | 1 | 2 | 3 | 4 | 5 | 6 | 7 |
|---|---|---|---|---|---|---|---|
| 1 | 0 | 1 | 1 | 1 | 1 | 1 | 1 |
| 2 | 1 | 0 | 1 | 0 | 0 | 1 | 1 |
| 3 | 1 | 1 | 0 | 1 | 0 | 0 | 1 |
| 4 | 1 | 0 | 1 | 0 | 1 | 0 | 1 |
| 5 | 1 | 0 | 0 | 1 | 0 | 1 | 1 |
| 6 | 1 | 1 | 0 | 0 | 1 | 0 | 1 |
| 7 | 1 | 1 | 1 | 1 | 1 | 1 | 0 |
AREA
FIG. 3C
MIS TABLE 80
AREA
|     | 1 | 2 | 3 | 4 | 5 | 6 | 7 |
|-----|---|---|---|---|---|---|---|
| A | 1 |   |   |   |   |   |   |
| B |   |   |   |   |   |   | 1 |
| C |   | 1 |   | 1 |   |   |   |
| D |   | 1 |   |   | 1 |   |   |
| E |   |   | 1 |   | 1 |   |   |
| F |   |   | 1 |   |   | 1 |   |
| G |   |   |   | 1 |   | 1 |   |
MIS
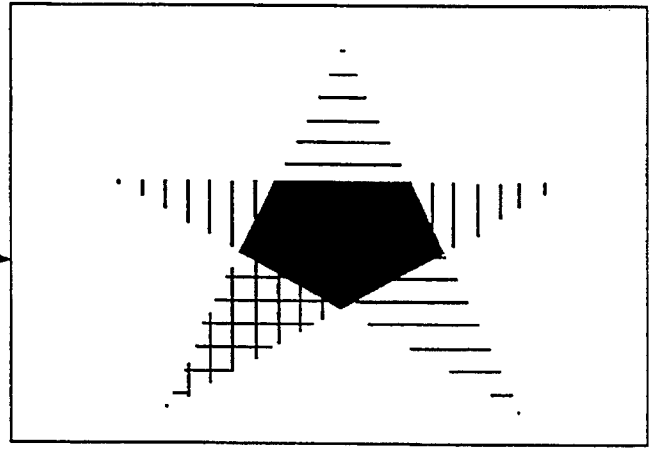
PRINTED IMAGE 92
FIG. 3D

METHOD AND APPARATUS FOR IMPROVED AREA DEMARCATION IN BIT MAPPED IMAGE DERIVED FROM MULTI-COLOR BIT MAPPED IMAGE

BACKGROUND OF THE INVENTION

1. Field of the Invention

This invention relates to the field of data processing, and, more particularly, to a method and apparatus for improving the demarcation between different areas of a derivative bit mapped image using a limited number of colors or dither patterns, which image is derived from a primary bit mapped image having a greater number of colors.

2. Description of Related Art

Often, a person using a personal computer having a color monitor desires a printed copy of the image or screen being displayed on the monitor. The results of printing the screen are often poorly demarcated and illegible, and look as if someone rolled a paint roller dipped in black paint over the sheet. This anomaly is attributable to the nature of commonly used monitors and printers. Displayed images normally have many colors. For example, the standard IBM color graphics array (CGA) can display 16 colors while the standard IBM video graphics array (VGA) can display 256 colors. On the other hand, the vast majority of printers are concerned with only two colors, the white of the paper and the black of the ink.

The most common techniques for attacking this problem are dithering and cross hatching. "Dithering" is the term used hereafter to refer to both techniques. Dithering uses various pixel patterns to demarcate areas in a derivative bitmap. For example, two adjacent areas (one a purple area and one a red area) in a primary bitmap may be rendered in a derivative bitmap using solid black for one area and a checkerboard pattern in the other area.

The limitations of dithering become more pronounced as the resolution or number of colors in the primary bitmap increases, or as the resolution or number of colors in the derivative bitmap decreases. Many printers do not have substantially higher resolution than the display being printed, and this makes it difficult to come up with a large number of visually unique dither patterns.

Dithering algorithms commonly attempt to map each unique color in the primary bitmap to a unique color/dither pattern in the derivative bitmap. The algorithms try to produce a 1:1 correspondence between the colors of the primary bit map and the colors/dither patterns of the derivative bitmap. They also maximize the number of unique color/dither patters in the derivative image but reduce demarcation and legibility. This result is unfortunate because, very often, a user is more interested in clearness and demarcation of the derivative (printed) bitmap than in preserving a 1:1 correspondence or mapping between different areas of the primary and derivative bitmaps.

SUMMARY OF THE INVENTION

One of the objects of the invention is to provide an improved method and apparatus for printing or displaying a derivative bit mapped image derived from a multi-colored primary bit mapped image, where the different areas of the derivative image are represented without there being a 1:1 correspondence with the representations in the primary image.

Another object of the invention is to print or display a derivative bit mapped image in which the different areas of the image are differentiated by a number of representations which is substantially smaller than the number of representations contained in a primary bit mapped image.

A further object of the invention is to print a bit mapped image, derived from a multi-color bit mapped image, using the color of paper being printed on, the color of the ink, and a small number of dither patterns.

Still another object of the invention is to display a derivative bit mapped image, derived from a multi-color bit mapped image, using the background color being displayed, at least one foreground color, and a small number of additional colors or dither patterns.

Briefly, in accordance with the invention, digital signals defining a bit mapped primary image are stored in a data processing system and displayed on a color monitor. These signals are processed by breaking down or separating the primary image into a set of areas where the pixels within each area have the same color. The set of areas is then analyzed to select a group of a minimum number of subgroups, which group contains all of the different areas. Different color/dither patterns are assigned to represent the different subgroups. Then, a derivative bit mapped image is produced in which the assigned representations are used, and the derivative image is then printed or displayed.

BRIEF DESCRIPTION OF THE DRAWINGS

Other objects and advantages of the invention will be apparent from the following description taken in connection with the accompanying drawings wherein:

FIG. 3A–3D are schematic diagram useful in understanding the invention in view of a specific example.

DESCRIPTION OF ILLUSTRATIVE EMBODIMENT

Figure 1:
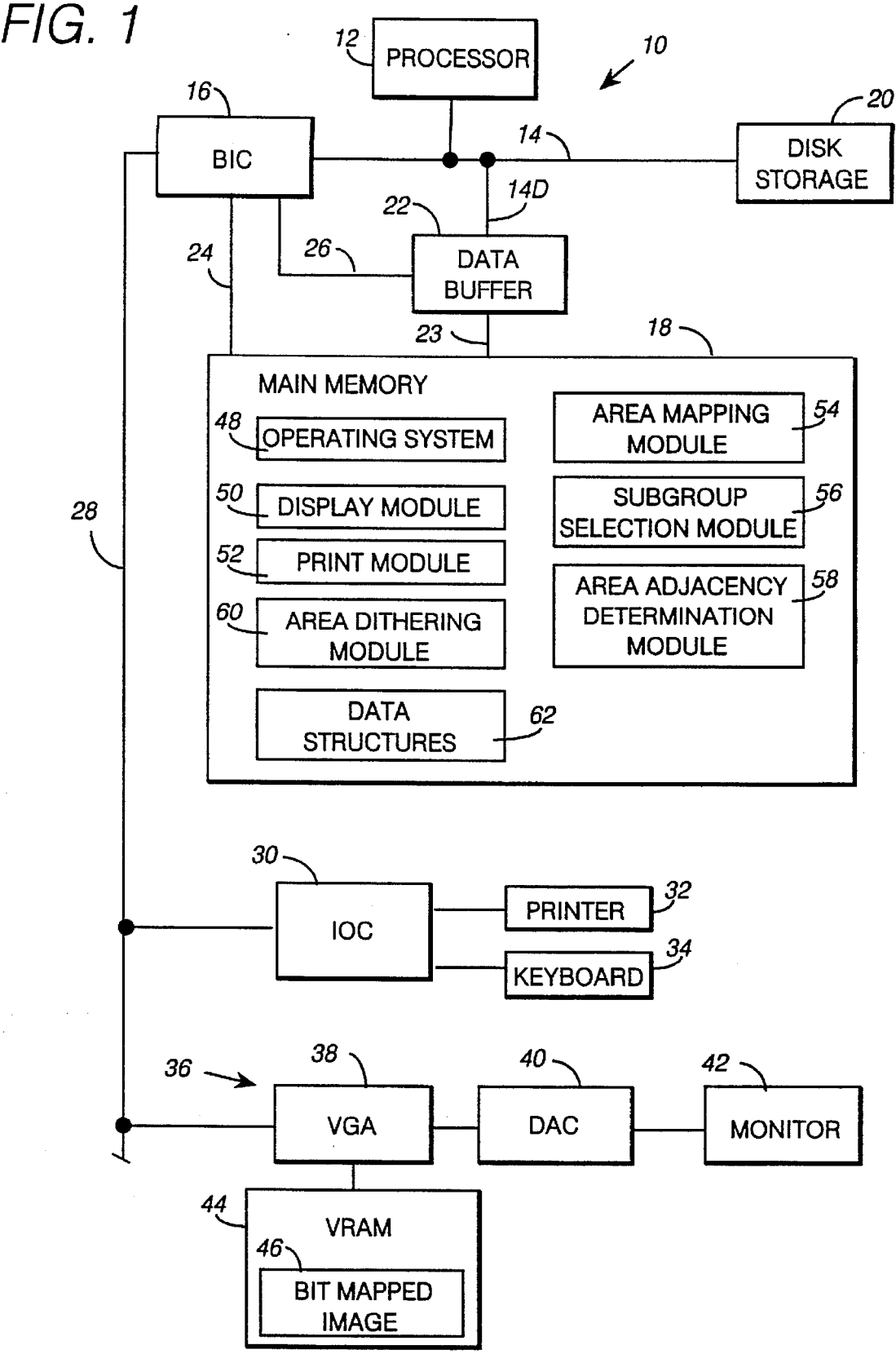
FIG. 1 is a block diagram of a data processing system embodying the invention.

Referring now to the drawings, and first to FIG. 1, there is shown a data processing system (DPS) comprising a personal computer 10 operable to execute application programs. Computer 10 is, e.g., an IBM PS/2 Model 57 personal computer. Such computer runs under an operating system such as the well known IBM DOS (disk operating system) or IBM OS/2 operating system. (IBM, PS/2 and OS/2 are trademarks of International Business Machines Corporation) Computer 10 comprises a microprocessor 12 connected to a local bus 14 which, in turn, is connected to a bus interface controller (BIC) 16, and a disk storage unit 20. Microprocessor 12 is preferably one of the family of 80xxx microprocessors, such as 80486 microprocessor. Local bus 14 includes conventional data, address, and control lines conforming to the architecture of such processor.

BIC 16 performs two primary functions. The first function is as a memory controller for accessing a main memory 18, which is a dynamic random access memory (RAM) that stores data and programs for execution by microprocessor 12. An address and control bus 24 connects BIC 16 with memory 18. A data bus 23 connects memory 18 to a data buffer 22 that is further connected to data bus 14D of bus 14. Control lines 26 interconnect BIC 16 and data buffer 22.

The second function of BIC 16 is to interface between bus 14 and an expansion bus 28 designed in conformance with IBM MicroChannel (MC) architecture. Bus 26 is further connected to an input/output controller (IOC) 30, and a video subsystem 36. IOC 30 is further connected to a printer 32 and a keyboard 34. Video subsystem 36 comprises a video signal processor (VSP) 38, a video RAM (VRAM) 44, a digital to analog converter (DAC) 40, and a color display or monitor 42 that provides a conventional output screen for viewing by a user.

Memory 18 stores various programs for execution by processor 12. Since memory 18 is volatile, the programs are also stored in disk storage 20 and loaded into main memory as needed. The programs include a standard operating system (OS) 48 such as the above mentioned IBM DOS or OS/2, a display module 50 for controlling operation of video subsystem 36, and a printer module 52 for controlling operation of printer 32. Display module 50 forms bit mapped images in VRAM 44 for display on monitor 42.

In PS/2 architecture, system video is generated by a video graphics array (VGA) and associated circuitry, which drive a color monitor 42 by analog signals. The VGA and monitor form part of video subsystem 36 that also includes a video random access memory (VRAM) 44 for storing the data or bit mapped image 46 to be displayed, and a video digital-to-analog converter (DAC) 40. VRAM 44 is also called a "video memory". A description of the video system appears in the "Video Subsystem (type 1)" section of the "IBM PERSONAL SYSTEM/2 HARDWARE INTERFACE TECHNICAL REFERENCE" manual, published by IBM in 1988. DAC 40 includes a group of registers (not shown) known as the video DAC palette registers. These palette registers store digital palette data for controlling the RGB (red, green, blue) output of the converter and hence the color of each pixel on the display. The video subsystem provides a resolution of 320×200 pixels for 256 color graphics. Thus, multi-color images can be displayed on the screen of monitor 42, with up to 256 colors at any one time.

The system as thus far described comprises standard hardware and software, and the novelty of the invention resides in programs 54, 56, 58, and 60, in the data structures 62 associated with such programs, and in the manner in which the system operates as a result of executing such programs. Such programs and data structures are represented in a standard manner, in the system, by digital signals that are processed by microprocessor 12 to perform the desired functions. The signals are generally referred to hereinafter by the information represented by the signals, e.g. "bit mapped image" instead of "signals representing a bit mapped image", to simplify the description.

Figure 2:
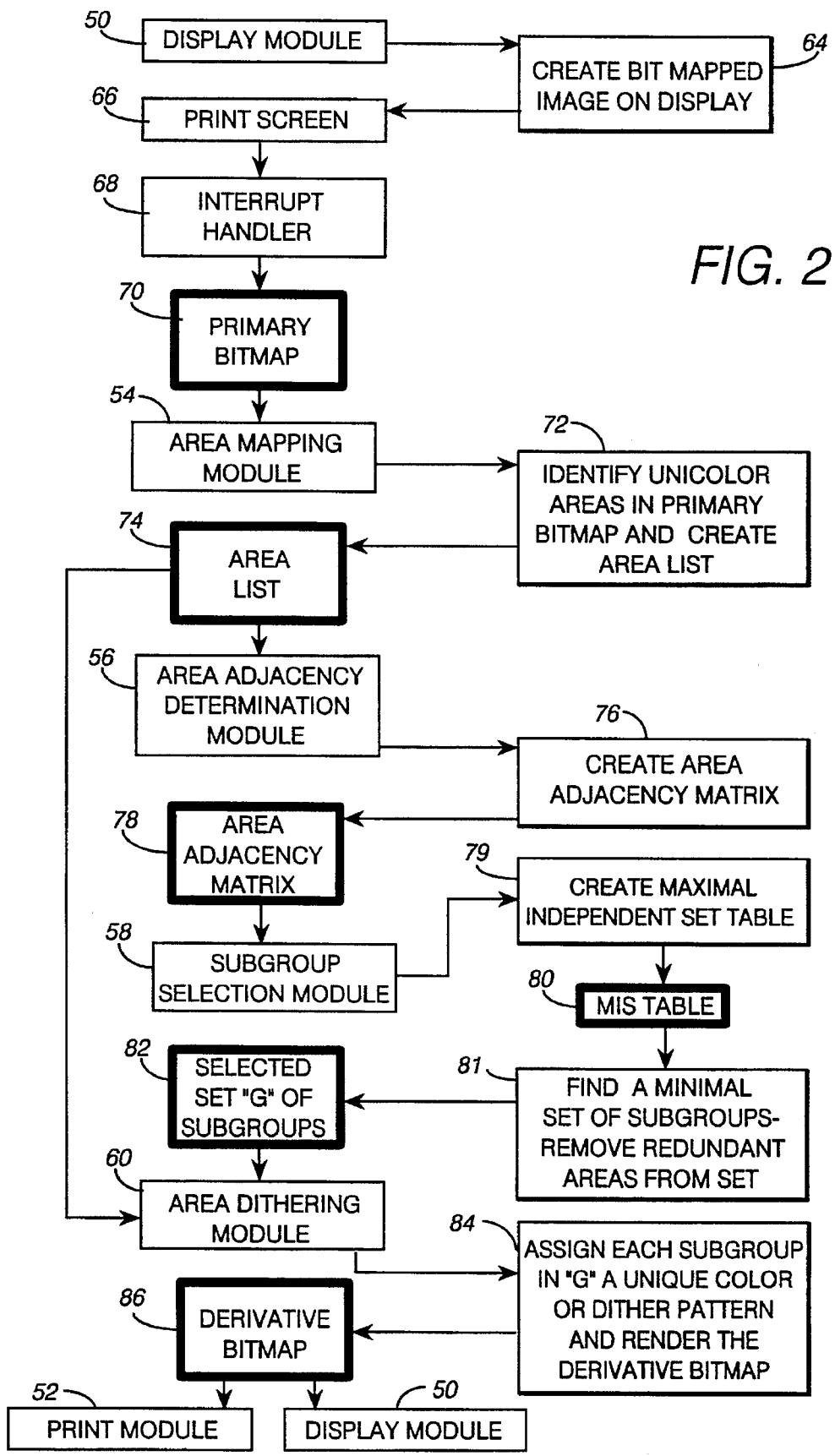
FIG. 2 is a schematic flow chart showing the interrelationship of various data structures, routines, and functions incorporated into the system shown in FIG. 1.

Referring now to FIG. 2, the various programs are shown in boxes having thin solid lines, the data structures are shown in boxes having bold lines, and the functions performed by some of the programs are shown in shadowed boxes located along the right side of FIG. 2. It is assumed, at the start, that the system has been turned on, and display module 50 has created, in step 64, bit mapped image 46 which is displayed on monitor 42. The initial image has a palette of 256 colors. Assume also that the user wants to print a hard copy of what is then being currently displayed. To obtain such copy, the user presses the Print Screen key of keyboard 34 to initiate print screen process 66. The actuation of the key causes an interrupt that is handled by an interrupt handler 68 which passes control to and initiates the succession of operations and actions described next.

First, a primary bitmap 70 is formed in main memory 18 by copying bit mapped image 46. Each pixel in the bitmap is represented as indicated above. Then area mapping module 54 performs the functions of identifying each unicolor area of the primary bitmap 72 and creating an area list 74. A "unicolor area" as used in this specification and claims, is defined to mean an area of contiguous pixels each having the same color. Each unicolor area is assigned a unique identifier "$Area_1$". Area list 74 lists all of the different area identifiers, X/Y locations of minimum sized, rectangular bounding boxes containing the respective areas, size of such boxes, and pointers to bounding bitmaps of the areas. This results in a set of N areas and the bitmap can be expressed as:

$$Bitmap=(Area_1, Area_2, Area_3, \ldots, Area_N)$$

Next, area adjacency module 56, using area list 74 as input, creates in step 76 an area adjacency matrix (AAM) 78, of the following form:

TABLE 1

|  | $Area_1$ | $Area_2$ | ... | $Area_N$ |
|---|---|---|---|---|
| $Area_1$ | 0 | X | X | X |
| $Area_2$ | X | 0 | X | X |
| ... | X | X | 0 | X |
| $Area_N$ | X | X | X | 0 |

In Table 1, each entry "X" in a cell is either a "0" to indicate the two corresponding areas are not adjacent, or a "1" to indicate the corresponding cells are adjacent. An area is not adjacent to itself and thus the cells corresponding to the same area are set to "0". Two areas are considered adjacent when at least one pixel in one area is adjacent to at least one pixel in the second area.

After matrix 78 has been created, subgroup selection module 58 is processed, and it creates, from AAM 78 in step 79, a table 80 of all maximal independent sets (MIS's). A MIS is a set of areas where all areas in the primary bitmap are either in or adjacent to an area in the MIS and no area in the MIS is adjacent to another area in that MIS. MIS table 80 is created by finding any and all MIS's having one area, then finding any and all MIS's having two areas, and so on, up to finding any and all MIS's having N areas. This process is done in accordance with the following algorithm, which is referred to hereafter as the "MIS table fill algorithm":

```
1  for AreaChooseCnt = 1 to N
2  {
3      Choose a previously unchosen set of AreaChooseCnt areas
         called TestSet in which
4      TestSet = (Area_1, Area_2 ..., Area_AreaChooseCnt)),
         if any such set exists
       {
6          if  {{any area in TestSet is adjacent to another area
              in  TestSet} OR
7              {{any area in the AAM is not in TestSet} AND
8               {that area is NOT adjacent to any area in
                  TestSet}}}
9          {
10             /* This TestSet doesn't qualify as a MIS and
                  will not be added to MIS table */
11         }
12         else
13         {
14             /* TestSet is a MIS */
15             Add TestSet to MIS table
16         }
17     {
18     else
19     {
20         /* All permutations of TestSet with
              AreaChooseCnt values, have been checked.
```

```
                    Loop to check all TestSet permutations with one
                            more area in TestSet */
21          AreaChooseCnt = AreaChooseCnt + 1;
22      }
23  }
```

As a result of this process, MIS table 80 is completed, the table being organized as set forth in the following Table 2:

TABLE 2

|        | Area$_1$ | Area$_2$ | ... | Area$_N$ |
|--------|----------|----------|-----|----------|
| MIS$_1$ | X | X | X | X |
| MIS$_2$ | X | X | X | X |
| ...    | X | X | X | X |
| MIS$_M$ | X | X | X | X | where each cell entry "X" is either a "1" meaning that the corresponding Area is contained in the corresponding MIS, or a "0" indicating the Area is not in the corresponding MIS. The table is initialized by having no entries. As each TestSet is found (line 15 of above algorithm) which qualifies as a MIS, a row is added to the table and a "1" is placed in that column of the row for each area contained in the MIS.

The next step 81 is to find a group of MIS's from MIS table 80 which:

1. Contains each area, (an area may be in more than one MIS within the group), and
2. Has the minimum number of MIS's in that group. (There may be multiple such groups)

Step 81 is done in accordance with the following algorithm, which is referred to hereafter as the "group selection algorithm":

```
1   MISChooseCnt = 1;
2   loop forever
3   {
4       Choose a previously unchosen set of MISChooseCnt
        different MIS's called TestMISSet where
5       TestMISSet = (MIS₁, MIS₂, . . . , MIS_MISChooseCnt),
        if any such set exists
6       {
7           if every area is in at least one of the MIS's in
            TestMISSet
8           {
9               exit the loop:
10          }
11      }
12      else
13      {
14              /* All permutations of TestMISSet with
                MISChooseCnt values, have been checked.
                Loop to check all TestMISSet permutations
                with one more MIS in TestMISSet */
15          MISChooseCnt = MISChooseCnt + 1;
16      }
17  }
```

Upon exiting the loop, a group "G" of MIS's has been found or located that has the minimum number of MIS's and contains every area. As noted before, it is likely that there is more than one possible group of MIS's that satisfies the above conditions. However, in the illustrated embodiment of the invention, the first eligible group of MIS's to be found, is chosen. The number of MIS's in the chosen group is the chromatic number "C" of the primary bitmap. "C" is also the number of color/dither patterns in the derivative bitmap. "C" is the minimum number of colors that could be used to draw the primary bitmap and ensure that no adjacent areas in the primary bitmap have the same color. Further, step 81 then removes any redundant areas from the chosen group of MIS's so that each area is in one, and only one, MIS within that group. Once redundant areas have been removed, the respective MIS's become "subgroups". The result is a selected set "G" of "C" subgroups. The selected set "G" is a data structure 82 for input into area dithering module 60.

Area dithering module 60 then, in step 84, assigns each subgroup in "G" a unique contrasting color or a unique dither pattern and renders a derivative bitmap 86 of the desired size and with "C" colors/dither patterns. Module 60 determines the shapes of the areas in the primary from area list 74. Step 84 associates a unique color/dither pattern with each subgroup. In the case of two color bitmaps, which is commonly used for many printers having only a single-colored black ink, dither patterns may be assigned in the order of 100% white, 100% black, 50% black/50% white, 75% black/25% white, and 25% black/75% white. Patterns such as vertical striping, cross hatching, etc. may also be used. Different colors may be used when the output device is a color monitor, or a color printer. The number of representations should be less than six in the majority of cases. However, in exceptional cases, additional representations may be added to provide the desired demarcation. When the primary bitmap is represented with 16 or 256 colors, the number of representations needed is substantially less than these numbers. The resultant derivative bit map is then printed on printer 32 by print module 52 and/or displayed on monitor 42 by display module 50.

While the above algorithms and process are generic to all cases, the following example is provided to facilitate a better understanding of the invention. The example corresponds to displaying, on monitor 42, a five-pointed star where the background and each segment of the star is displayed in a different color. Such areas are respectively displayed in gray, red, orange, yellow, green, blue, and violet colors. With reference to FIG. 3, the primary bitmap 70 has seven different areas identified by the numbers 1–7. Since color cannot be shown in the figure, the different areas are delineated by black lines, it being understood that no such lines exist in the multicolor image. Primary bitmap 70 specifies the color of each pixel represented by the bitmap. The bitmap is processed in step 72 by examining each pixel, determining how many different unicolor areas are contained in the image, and creating the area list 74. Upon completion of step 72 for the example, list 74 lists Area$_1$–Area$_7$ which are referred to hereafter simply as areas 1–7.

Next, (in step 76) the respective areas are processed to determine which areas are adjacent each other, and AAM 78 is created containing the values shown in FIG. 3B. The left column and the upper row are the area identifiers, and the remaining entries of ones and zeroes represent whether the areas are adjacent or not. As indicated above, two areas are considered adjacent when one pixel of one area is adjacent to a pixel of another area. This determination should be obvious when two areas are adjacent along one of the black lines in FIG. 3A that delineate the areas. Where two black lines intersect, such as at 90, there should be one pixel of each area that is adjacent to three pixels in the other areas. Thus, area 1 and area 7 are adjacent to each other and to areas 2–6, as shown in AAM 78.

The next processing function (step 79) is completing MIS table 80 in accordance with the above MIS table fill algorithm. At the start, AreaChooseCnt is set to "1" and the bitmap is then examined one area at a time to determine if that area qualifies as a MIS. Thus, area 1 is first chosen and tested to see if it meets the test or logic conditions of line 6, i.e., is area 1 adjacent to another area of the TestSet. Since there is only one area in the TestSet, the first test is not met since there is no other area in the test set and therefore there is no adjacency between areas of the test set. Next, area 1 is tested to see if it meets the ANDed conditions of lines 7 and 8. First, is there any area of AAM not in the test set? The answer is "yes", areas 2–7 are not in the TestSet. Second, is any such area not adjacent to any area in the TestSet? Here, the answer is "no" because all of the other areas are adjacent to area 1. Therefore, area 1 qualifies as a MIS and the algorithm proceeds to line 15 where area 1 is added to MIS table 80 as MIS A.

Next, area 2 is chosen as a TestSet. It is analyzed in a similar fashion and is rejected as a MIS by meeting the conditions of both lines 7 and 8 since areas 4 and 5 are not in the TestSet and are also not adjacent to area 2 of the TestSet. The algorithm then proceeds to test the other single areas of the area list in a similar fashion. As a result, areas 3–6 are rejected and area 7 is found to qualify, for reasons similar to those by which area 1 qualifies. Thus, at the end of testing all single area permutations, MIS A and B have been added to the MIS table and AreaChooseCnt is then advanced to "2" for next testing different permutations of two areas at a time.

First, area 1 is tested with each other area and each TestSet of the two areas fails because each other area is adjacent to area 1. The tests are quickly done by examining AAM 78 in the row for area 1 and rejecting the other areas that contain "1's". Area 2 is then tested with the remaining areas. The TestSets are rejected for areas 3, 6, and 7 because they are adjacent to area 2. For the TestSet of area 2 with area 4, area 4 is not adjacent to area 2. For lines 7 and 8, areas 1, 3, 5, 6 and 7 are not in the current test set, but each of these areas is adjacent to either area 2 or 4 of the test set. Areas 1 and 7 are adjacent to both areas 2 and 4. Areas 3 and 6 are adjacent to area 2, and area 4 is adjacent to area 5. Therefore, such TestSet qualifies as a MIS and the results are posted in the MIS table as MISC.

The algorithm continues testing the remaining permutations of two areas, then three areas, and so on until all permutations have been covered. Upon completion, MIS table 80 is filled out as shown in FIG. 3C, from which the 0's have been omitted for simplicity. The table contains seven MIS's A–G from which a minimal set of MIS's is selected next by the above group selection algorithm.

The group selection algorithm searches for a group of MIS's having a "1" in each column of the MIS table, which means that the group contains each area of the bitmap. The searching is done by checking different permutations of different numbers of MIS's where the number is determined by the MISChooseCnt value set in line 1 above. When this value is set to "1", only single MIS's are checked. When the value is set to "2", various combinations of two MIS's are checked For the particular example shown in FIG. 3C, the group selection algorithm does not find any set that meets the selection criteria until MISChooseCnt equals "5" and MIS's A, B, C, E, and F are analyzed. At that point, this set or group contains each area of the bitmap as represented by a "1" being present in each column of MIS table 80 for such group. While additional searching would find further groups that also satisfy the selection criteria, the algorithm ends upon finding the first group of MIS's.

Next, each redundant area is removed from the group. In the example area 3 is present in both MIS E and F, and it is arbitrarily removed from MIS E. The result is that a group "G" has been found containing five subgroups with the following areas:

Subgroup A={1}

Subgroup B={7}
Subgroup C={2,4}
Subgroup E={5}
Subgroup F={3,6}

Different ways to visually represent the areas are then assigned to the subgroups. In the example, the assignment is:
Subgroup A=100% white
Subgroup B=100% black
Subgroup C=horizontal striping
Subgroup E=cross hatching
Subgroup F=vertical striping The derivative bitmap is rendered with such representations, and, when printed, produces the image 92 shown in FIG. 3D. The spacings between the hatching and striping lines in image 92 is relatively coarse, for simplicity of illustration. Quite obviously, a closer spacing produces more clearly defined demarcation between the different areas.

It should be apparent to those skilled in the art that many changes can be made in the details and arrangements of steps and parts without departing from the scope of the invention as defined in the appended claims.

What is claimed is:

1. A method of operating a data processing system having processing means and a video subsystem; said processing means comprising a main memory for storing programs and data, and a processor for executing said programs and processing said data; said video subsystem comprising a color monitor for displaying images and a video memory for storing bitmaps of images being displayed, said method comprising:

(a) storing in said main memory a primary bitmap of a color image being displayed on said monitor;

(b) creating an area list of unicolor areas each unicolor area consisting of contiguous pixels each having the same color;

(c) creating an area adjacency matrix identifying adjacency and non-adjacency between said unicolor areas;

(d) selecting a set of subgroups containing all of said unicolor areas, which set contains a minimum number of subgroups allowing said areas to be demarcated by a like number of different visual representations;

(e) rendering a derivative bitmap in which each subgroup has a different visual representation and each area in a subgroup has a like visual representation; and (f) outputting said derivative bitmap to produce a visually perceivable image in which areas of said subgroups are demarcated by said visual representations.

2. A method in accordance with claim 1 wherein step (d) comprises:

(d1) creating a MIS table of all maximal independent sets (MIS's), each MIS containing a set of unicolor areas in accordance with logical conditions that all areas in the primary bitmap are either in, OR adjacent to an area in the MIS AND no area in the MIS is adjacent to another area in the MIS;

(d2) testing different permutations of MIS's in said MIS table until a permutation is found containing said minimum number of MIS's; and (d3) purging redundant areas from said permutation found in step (d2) to form said subgroups.

3. A method in accordance with claim 2 wherein step (d1) comprises: testing permutations of said areas listed in said area adjacency matrix (AAM) and adding to said MIS table each permutation that fails to be rejected in accordance with the logic that an area in the permutation being tested is adjacent to another area therein, OR any area in said AAM is not in such permutation AND that area is NOT adjacent to any area in such permutation.

4. A method in accordance with claim 1 wherein step (e) comprises forming said visual representations using a background color, a foreground color, and one or more dithering patterns composed of said background and foreground colors when the number of different representations exceeds two.

5. A method in accordance with claim 4 wherein said step (f) comprises outputting said derivative bitmap on said monitor whereby said background and foreground colors are the background and foreground colors of said monitor.

6. A method in accordance with claim 4 wherein step (f) comprises outputting said derivative bitmap on a graphics printer whereby said background and foreground colors are the color of paper being printed on and the color of ink being printed.

7. A method in accordance with claim 1 wherein each said different visual representation is a different color; and step (f) comprises outputting said derivative bitmap on said monitor and displaying said primary bitmap using a different color for all of the areas in each subgroup.

8. A data processing system comprising:

a video subsystem comprising a color monitor for displaying images and a video memory for storing bitmaps of multi-color images being displayed;

processing means comprising a main memory for storing programs and data, and a processor for executing said programs and processing said data;

first means for copying a bitmap of a color image being displayed, from said video memory into said main memory and for storing said bitmap as a primary bitmap of an image being displayed on said monitor;

second means for processing said primary bitmap and for storing into said main memory an area list of unicolor areas each of which comprises contiguous pixels having the same color;

third means for processing said area list and for storing into said main memory an area adjacency matrix identifying adjacency and non-adjacency between said unicolor areas;

fourth means for processing said area adjacency matrix to select and store into said main memory a set of subgroups containing all of said unicolor areas, which set contains a minimum number of subgroups allowing said areas to be demarcated by a like number of visual representations so that all adjacent areas have different visual representations;

fifth means for rendering and storing into said main memory a derivative bitmap in which each subgroup has a different visual representation and each area in a subgroup has a like visual representation; and an output device for outputting said derivative bitmap to produce a visually perceivable image in which areas of said subgroups are demarcated by said visual representations.

9. A data processing system in accordance with claim 8 wherein said fourth means comprises:

sixth means for creating a MIS table of all maximal independent sets (MIS's), each MIS containing a set of areas in accordance with logical conditions that all areas in the primary bitmap are either in, OR adjacent to an area in the MIS AND no area in the MIS is adjacent to another area in the MIS;

seventh means for testing different permutations of MIS's in said MIS table until a permutation is found containing said minimum number of MIS's; and eighth means for purging redundant areas from said permutation found by said seventh means, to form said subgroups.

10. A data processing system in accordance with claim 9 wherein said sixth means comprises:

ninth means for testing permutations of said areas listed in said area adjacency matrix (AAM) and adding to said MIS table each permutation that fails to be rejected in accordance with the logic that an area in the permutation being tested is adjacent to another area therein, OR any area in said AAM is not in such permutation AND that area is NOT adjacent to any area in such permutation.

11. A data processing system in accordance with claim 8 wherein said fifth means comprises means for forming said visual representations using a background color, a foreground color, and one or more dithering patterns composed of said background and foreground colors when the number of representations exceeds two.

12. A data processing system in accordance with claim 11 wherein said output device is said monitor and said background and foreground colors are background and foreground colors of said monitor.

13. A data processing system in accordance with claim 11 wherein said output device is a graphics printer, and said background and foreground colors are the color of paper being printed on and the color of ink being printed.

14. A data processing system in accordance with claim 8 wherein said different visual representations rendered and stored by said fifth means are different colors, and said output device is said monitor in which said subgroups are displayed with such different colors.

* * * * *